(12) United States Patent
Darcy

(10) Patent No.: US 10,909,086 B2
(45) Date of Patent: Feb. 2, 2021

(54) FILE LOOKUP IN A DISTRIBUTED FILE SYSTEM

(71) Applicant: Red Hat, Inc., Raleigh, NC (US)

(72) Inventor: Jeffrey Jon Darcy, Lexington, MA (US)

(73) Assignee: RED HAT, INC., Raleigh, NC (US)

( * ) Notice: Subject to any disclaimer, the term of this patent is extended or adjusted under 35 U.S.C. 154(b) by 811 days.

(21) Appl. No.: 14/543,623

(22) Filed: Nov. 17, 2014

(65) Prior Publication Data

US 2016/0140141 A1 May 19, 2016

(51) Int. Cl.
*G06F 16/182* (2019.01)
*H04L 29/08* (2006.01)
*G06F 16/13* (2019.01)
*G06F 16/14* (2019.01)

(52) U.S. Cl.
CPC .......... *G06F 16/183* (2019.01); *G06F 16/137* (2019.01); *G06F 16/148* (2019.01); *H04L 67/1023* (2013.01); *H04L 67/1097* (2013.01)

(58) Field of Classification Search
CPC .... G06F 16/183; G06F 16/148; G06F 16/137; H04L 67/1023; H04L 67/1097
USPC .......................................................... 709/221
See application file for complete search history.

(56) References Cited

U.S. PATENT DOCUMENTS

| | | | |
|---|---|---|---|
| 2003/0126200 A1* | 7/2003 | Wolff | G06F 9/52 709/203 |
| 2006/0080353 A1* | 4/2006 | Miloushev | H04L 29/06 |
| 2009/0013009 A1* | 1/2009 | Nakayama | G06F 11/1453 |
| 2009/0019047 A1* | 1/2009 | Anderson | G06F 16/1774 |
| 2010/0235409 A1* | 9/2010 | Roy | G06F 16/1827 707/812 |
| 2011/0161335 A1* | 6/2011 | Dash | G06F 17/30194 707/758 |
| 2011/0162070 A1* | 6/2011 | Krasser | G06F 21/564 726/23 |
| 2012/0124046 A1* | 5/2012 | Provenzano | G06F 3/0605 707/737 |
| 2012/0233293 A1* | 9/2012 | Barton | H04L 67/06 709/219 |
| 2013/0018928 A1* | 1/2013 | Lacapra | H04L 67/104 707/822 |
| 2013/0290249 A1* | 10/2013 | Merriman | G06F 17/30584 707/610 |
| 2013/0311612 A1* | 11/2013 | Dickinson | H04L 67/1097 709/219 |
| 2014/0006354 A1* | 1/2014 | Parkison | G06F 17/30194 707/649 |
| 2014/0007239 A1* | 1/2014 | Sharpe | G06F 21/561 726/24 |

(Continued)

*Primary Examiner* — Umar Cheema
*Assistant Examiner* — Tony Williams
(74) *Attorney, Agent, or Firm* — Womble Bond Dickinson (US) LLP

(57) ABSTRACT

A request to store a file in a directory of a volume associated with a distributed file system may be received. A server of a plurality of servers of the distributed file system that is associated with the file may be identified. A first version number associated with the directory and a second version number associated with the volume may be compared. The file may be stored in the directory at the identified server when the first version number matches the second version number and when the file is not currently stored at the server.

15 Claims, 8 Drawing Sheets

(56) References Cited

U.S. PATENT DOCUMENTS

2014/0172800 A1* 6/2014 Clark .................... G06F 8/71
                                                    707/638

* cited by examiner

FILE LOOKUP IN A DISTRIBUTED FILE SYSTEM

TECHNICAL FIELD

Aspects of the disclosure generally relate to distributed file systems and, more specifically, relate to file lookup in a distributed file system.

BACKGROUND

A distributed file system may include multiple storage servers that are each associated with at least one storage device that is used to store files of the distributed file system. Multiple users may access the distributed file system in order to store different files across the storage servers. For example, a first user may access the distributed file system to store a first file and a second user may access the distributed file system to store a second file in the distributed file system. The first file may be stored in a first storage server and the second file may be stored in a second storage server.

Furthermore, certain users of the distributed file system may seek to store a file in the distributed file system that has already been stored in one of the storage servers. For example, a request to store a first file may be received by the distributed file system and the first file may be stored in the first storage server. A second request to store another copy of the first file may be received at another time.

As such, in a conventional distributed file system, multiple copies of a file may be received from users to be stored in the distributed file system. In order to to ensure that multiple copies of the same file are not stored in the same distributed file system, all of the storage servers of the distributed file system may need to be queried to verify whether a copy of the file has already been stored in one of the storage servers of the distributed file system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
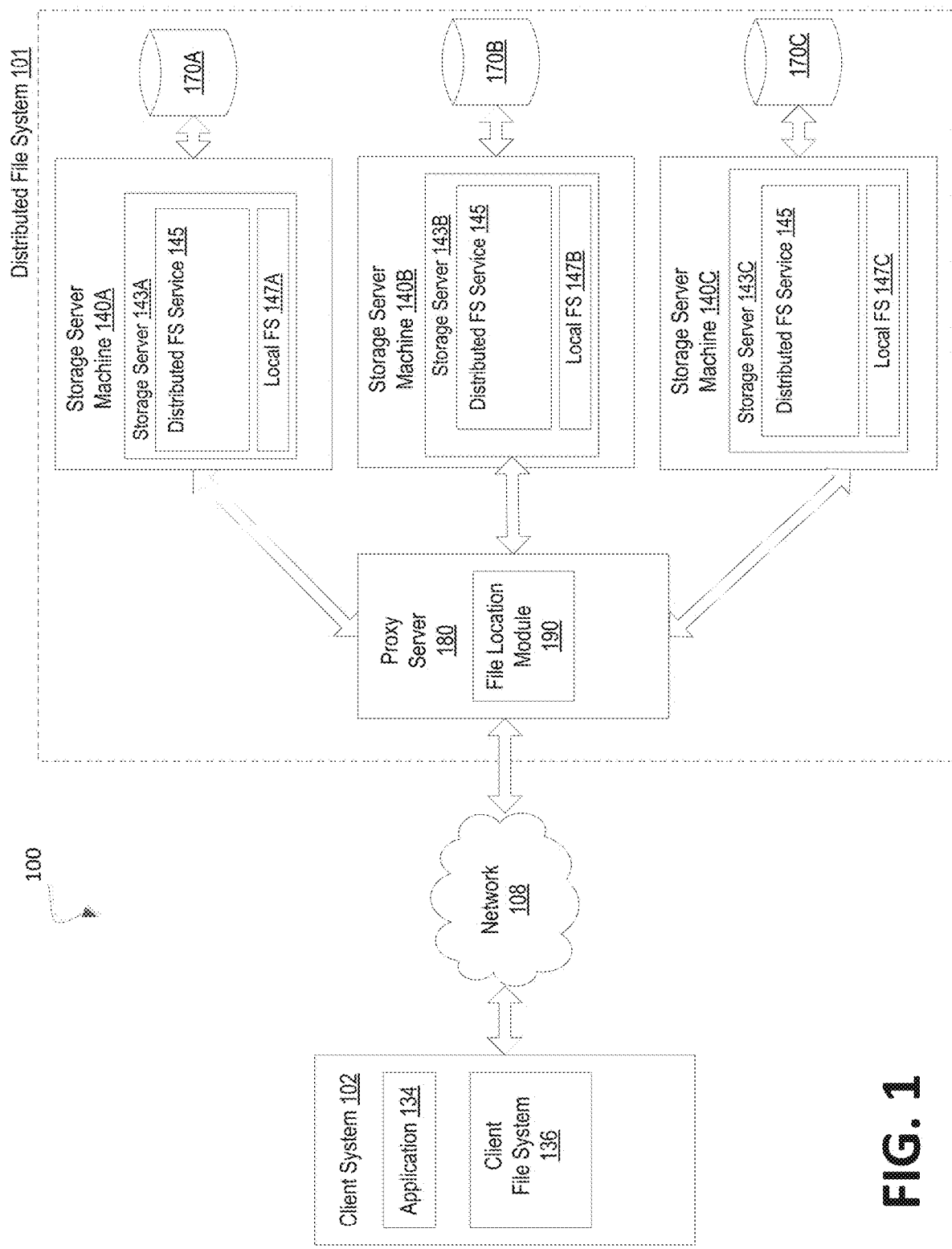
FIG. 1 illustrates an example system architecture in which embodiments of the disclosure may operate.

Aspects of the present disclosure relate to file lookup in a distributed file system. A distributed file system may be a type of cloud computing infrastructure or system that includes multiple servers. The servers of the distributed file system may be associated with or may manage storage resources to store files. Such servers may be referred to as storage servers.

The distributed file system may be used by multiple users or client systems. For example, client systems may write or store files in the storage resources at the storage servers of the distributed file system as well as read or retrieve files at the storage servers of the distributed file system. The storage servers may store the files from the client computer systems based on an organization that specifies which files may be stored at particular storage servers. For example, a first type of file may be stored at a first storage server and a second type of file may be stored at a second storage server. Accordingly, when a file is to be written or stored in the distributed file system, a location (e.g., a particular storage server) to store the file may be selected based on matching the type of file with a storage server that has been specified to store the particular type of file.

The files may be stored in the distributed file system based on a hash number that is calculated for the file and the storage servers may be organized based on hash number ranges. A hash algorithm may map data of arbitrary length (e.g., a name of the file) to data of a fixed length (e.g., the hash number). Accordingly, when a file is to be stored in the distributed file system, a hash number may be calculated based on the name of the file and the file may be stored based on a storage server that has been assigned a hash number range that encompasses or includes the calculated hash number for the file.

The configuration of the storage servers for the distributed file system may be changed by the adding of storage servers and/or the removing of storage servers. Accordingly, when the configuration of the storage servers for the distributed file system changes, the organization of the storage servers associated with storing types of files may also need to be changed. Such a process may be referred to as a rebalancing operation. As an example, a first storage server may be associated with a hash number range of 0-100 and may store files with calculated hash numbers in the range of 0-100. A second storage server may be associated with a hash number range of 101-200 and may store files with calculated hash numbers in the range of 101-200. If a third storage server is added to the distributed file system, then a rebalancing of distributed file system may result in the changing of the hash number ranges assigned to the first and second storage servers. For example, the first storage server may be assigned a hash number range from 0-66, the second storage server may be assigned a hash number range from 67-123, and the third storage server may be assigned a hash number range from 124-200.

The rebalancing of the distributed file system may result in additional operations that are needed to ensure that duplicate copies of the same file are not stored in the distributed file system. For example, a first file may be stored in a first storage server that is associated with a first hash number range that includes a hash number calculated based on the name of the first file. At a later point, the storage servers of the distributed file system may be rebalanced and the first hash number range associated with the first storage server may be changed to a different hash number range. After the rebalancing of the storage servers of the distributed file system, the first file associated with the hash number may thus be stored in a storage server that is associated with a hash number range that no longer includes the hash number of the first file. A copy of the first file may later be received by the distributed file system for storage from another user. The hash number of the copy of the first file may be associated with a second storage server after the rebalancing (as opposed to the first storage server before the rebalancing). The distributed file system may query the second storage server and receive a response that verifies that the first file is not stored at or on the second storage server. In response to such a verification, a subsequent query to all other storage servers of the distributed file system may be performed to identify if another copy of the first file is stored at any of the other storage servers.

Accordingly, when the second storage server verifies that the first file is not stored at the second storage server, multiple queries may be transmitted to other storage servers of the distributed file system and multiple responses to the queries may be received from the other storage servers. If at least one of the other storage servers responds to the query with a verification that the first file is stored at one of the other storage servers, then a copy of the first file may not be stored at the second storage server as a duplicate of the first file is already stored in the distributed file system. Alternatively, if all of the query responses from the other storage servers verify that a copy of the first file is not stored at the respective storage servers, then the first file may be stored in the second storage server of the distributed file system as no copy of the first file is currently stored in any storage server of the distributed file system.

The querying of additional storage servers after the verification from one storage server (e.g., the second server as previously described) that a file is not stored at the one storage server may result in inefficient storing or creating of files in the distributed file system. For example, storing or creating a file for a user or client system of the distributed file system may take a longer amount of time as each of the storage servers of the distributed file system may be queried and a response to each query may be received before the file is to be stored or created in the distributed file system.

Aspects of the present disclosure address the above and other deficiencies. In some embodiments, the files of the distributed file system may be stored in a volume that includes multiple directories (e.g., a structure in the distributed file system that references specific files or other directories). A set of storage servers may be used to provide storage resources for the volume and a subset or portion of the set of storage servers may be used to provide storage resources for a directory of the volume. In some embodiments, the volume may be organized into a hierarchy of directories such that multiple paths (e.g., locations to store files under directories) may be associated with the volume. For example, a first directory of the volume may be associated with a first storage server and a second storage server (e.g., the first and second storage servers store files of the first directory) while additional storage servers may store files may be associated with files stored in other directories of the volume. Accordingly, multiple storage servers may be associated with storing files in the same path (e.g, same directory).

In some embodiments, a distributed file system may use a file location module to perform a file location verification process. Such a file location module may be used to verify that a copy of a file is not already stored in a particular directory of a volume (e.g., in a storage server that provides storage resources of the directory). For example, version numbers (also referred to as generation numbers) may be stored for each directory within a volume as well as for the volume itself. The version numbers for the volume may refer to or be based on the last time that the configuration of storage servers for the volume of the distributed file system changed (e.g., the last time storage servers were removed and/or added) and the version number for each directory may refer to or be based on the last time that the directory was rebalanced (e.g., the last time that files were migrated from one storage server to another storage server based on the rebalancing of the hash number ranges as previously described). The version numbers may be used to determine whether or not to transmit queries to additional storage servers. For example, if a first storage server determines that a first file is not currently stored in a particular directory at the first storage server, then the file location module may compare the version number associated with the directory at the first storage server with the version number associated with the volume of the distributed file system. If the two version numbers do not match (e.g., the version numbers are different), then the additional storage servers of the distributed file system may be queried to determine if any of the additional storage servers are currently storing a copy of the first file at the directory. Alternatively, if the two version numbers do match (e.g., the version numbers are the same), then the additional storage servers may not be queried and the first file may then be stored at the directory in the first storage server. Accordingly, the use of the version numbers may reduce the amount of time that a user should wait before a file is stored or created in the distributed file system.

FIG. 1 is an example system architecture 100 for various implementations of the disclosure. The system architecture 100 may include a distributed file system 101 coupled to one or more client machines 102 via a network 108. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 may be a network attached storage file system that includes one or more storage server machines 140A, 140B, and 140C, each of which may control and manage any number of storage resources 170A, 170B, and 170C. A storage server machine 140A-C may include a network-accessible server-based functionality (e.g., storage server 143A-C) or other data processing equipment. The storage server machines 140A-C may include, but are not limited to, any data processing device, such as a desktop computer, a laptop computer, a mainframe computer, a personal digital assistant, a rack-mount server, a hand-held device or any other device configured to process data. The storage server machines 140A-C of the distributed file system 101 may be grouped into one or more clusters. A cluster may be a group of linked storage servers 143A-C working together closely.

The storage resources 170A-C may be mass storage devices, such as magnetic or optical storage based disks, solid-state drives (SSDs) or hard drives, coupled to the storage server machines 140A-B (either directly or via the network 108). The storage resources 170A-C may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-C may each host a local file system that manages the storage of data on storage resources 170A-C. Each of the storage resources 170A-C may be formatted in accordance with a particular local file system (FS) 147A-C. The local FS 147A-C may create directories, partitions, logical volumes, and so forth on the storage resources 170A-C as well as store data (e.g., files) thereon. Examples of local disk file systems that may be used on disk storage resources include, but are not limited to, EXT3, EXT4, XFS, NTFS, FAT16, FAT32, and so forth. Various flash file systems, tape file systems, optical disc file systems, memory files systems and so on may alternatively be used for other non-disk storage resources (e.g., for memory storage resources).

Storage servers 143A-C may each additionally include an instance of a distributed file system (FS) service 145. The distributed FS service 145 interfaces with local file systems 147A-C to store files on the storage resources 170A-C, as well as allow retrieval of stored files to the client system 102. The distributed file system service 145 instances additionally interface with one another to form the distributed file system 101.

The distributed file system services 145, and thus the distributed file system 101, may store data as files and may include directories, also referred to as folders, which are virtual containers within the distributed file system 101, in which groups of computer files and possibly other directories may be kept and organized. The distributed file system 101 may organize data (e.g., files) in the disks 170A-C using volumes. A volume may be a single accessible storage area of the distributed file system 101 that may be resident on a single partition or directory of a hardware resource 170A-C (e.g., of a hard disk) of the file system 101. A volume may be a representation of a logical location, rather than a physical location, of a storage area in the file system 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

In some embodiments, a volume of the distributed file system 101 may be associated with multiple storage servers and storage resources 170A-C. Files of a volume may be stored across the storage resources 170A-C. For example, a volume label "C:" may be assigned to a partition or portion of a first storage resource 170A, a partition or portion of a second storage resource 170B, and a partition or portion of a third storage resource 170C. As such, files of a single volume may be distributed between multiple storage resources 170A-C that are managed by multiple storage servers 140A-C. Thus, files of a volume may be stored across one or more storage servers. In some embodiments, the files of the volume may be distributed across multiple directories (e.g., a hierarchical path) that are associated with multiple storage servers.

Any number of client systems 102 may include a client file system 136 to communicate with the storage servers 143A-C in the distributed file system 101. The client system 102 may a computing device such as a server computer, a desktop computer, a set-top box, a gaming console, a television, a portable computing device such as, and not limited to, mobile telephones, personal digital assistants (PDAs), portable media players, netbooks, laptop computers, electronic book reader, and the like. The client machines 102 may host one or more applications 134. An application 134 may be any type of application including, but not limited to, a web application, a desktop application, a browser application, etc. An application 134 may request access (e.g., read, write, etc.) to the data in the distributed file system 101. For example, the application 134 may request to read or write files stored in a volume associated with storage resources 170A-C.

The distributed file system (FS) service 145 may include a proxy server 180. In some embodiments, the proxy server 180 may receive read and write requests from the client systems 102. In some embodiments, a file location module 190 may identify whether a copy of a particular file is already stored at one of the storage servers 140A-C in one of the storage resources 170A-C in response to a request to store or create the particular file from the client system 102. In alternative embodiments, the file location module 190 may be included in the client system 102 and/or storage server machines 140A-C. Further details with regard to the file location module 190 are disclosed below.

Figure 2:
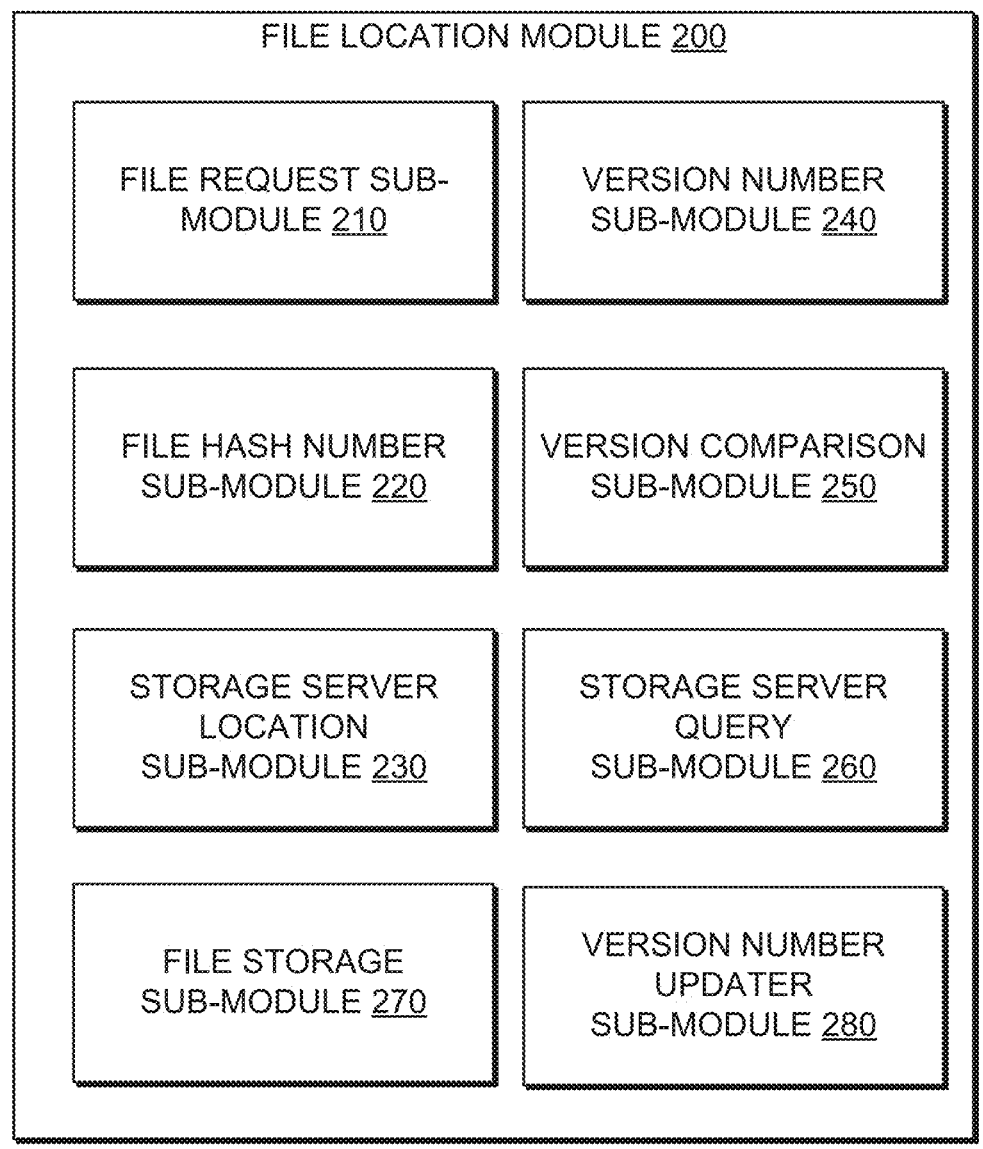
FIG. 2 illustrates an example file location module in accordance with some embodiments of the disclosure.

FIG. 2 is a block diagram of an example file location module 200. In general, the file location module 200 may correspond to the file location module 190 of FIG. 1. The file location module 200 may include a file request sub-module 210, a file hash number sub-module 220, a storage server location sub-module 230, a version number sub-module 240, a version comparison sub-module 250, a storage server query sub-module 260, a file storage sub-module 270, and a version number updater sub-module 280. In alternative embodiments, the functionality of one or more of the sub-modules may be combined or divided.

As shown in FIG. 2, the file location module 200 may include a file request sub-module 210. In some embodiments, the file request sub-module 210 may receive a request to store or create a file in a distributed file system. For example, a client system may access the distributed file system and may request to have a file with an identifiable file name to be stored at a directory of a volume in the distributed file system.

The file hash number sub-module 220 may receive information associated with the file that is requested to be created or stored in the distributed file system. For example, the file hash number sub-module 220 may identify the name of the file and may perform a hashing algorithm on the name of the file to determine a hash number corresponding to the file. In some embodiments, the hash algorithm may be a function that is used to map data of arbitrary size (e.g., the file name) to data of a fixed size (e.g., the hash number), with slight differences in input data producing differences in the output of the hash algorithm. The values returned by the hash algorithm may be referred to as hash values, hash codes, hash sums, hashes, or hash numbers. Although the hash number may be based on the name of a file, in some embodiments, the hash number may be based on any other characteristic of the file (e.g., a user account or client system associated with the file).

The storage server location sub-module 230 may identify a particular storage server that is associated with the calculated hash number for the file that has been requested to be stored or created in the distributed file system. For example, the storage server location sub-module 230 may identify a storage server of the distributed file system that is associated with a hash number range that includes the hash number that has been calculated for the file. Furthermore, in some embodiments, the storage server location sub-module 230 may subsequently identify if the file is currently stored at the directory in the corresponding storage server. For example, if another file with the same hash number is currently stored at the same directory in the corresponding storage server, then the file may be considered to already be stored at the directory in the corresponding storage server. However, if no other file with the hash number that has been calculated based on the name of the file is currently stored at the directory in the corresponding storage server, then the file may not be considered to be stored at the directory in the corresponding storage server.

The version number sub-module 240 may retrieve a first version number associated with a directory of a volume from the storage server identified by the storage server location sub-module 230 and a second version number from the volume associated with the storage server in the distributed file system. Additionally, the version number comparison sub-module 250 may compare version numbers from the directory at a storage server and a volume of the distributed file system. For example, the version number sub-module 240 may determine whether or not the version number from the directory at the storage server identified by the storage server location sub-module 230 matches (e.g., is identical to) a version number from the volume of the distributed file system.

The storage server query sub-module 260 may query one or more servers based on the results of the version comparison sub-module 250. For example, if the version number for the directory from the storage server identified by the storage server location sub-module 230 does not match the version number from the volume of the distributed file system, then additional storage servers associated with the volume (e.g., used to provide storage resources for files in the volume) of the distributed file system may be queried. In some embodiments, the query to each of the additional storage servers may include a request for each of the additional storage servers to identify if a file with the same hash number is currently stored at the same directory in any of the respective additional storage servers. The storage server query sub-module 260 may further receive query responses from each of the additional storage servers that determines whether or not the file is stored at the directory in each respective additional storage server. In some embodiments, the storage server query sub-module 260 may not transmit a query to the additional storage servers if the version number for the directory from the storage server identified by the storage server location sub-module 230 matches a version number associated with the volume.

The file storage sub-module 270 may store a file based on the results of the storage server query sub-module 260. For example, the file storage sub-module 270 may store a file at the directory in the storage server identified by the storage server location sub-module 230 if the identified storage server does not currently store a file with the same hash number associated with the file at the directory and if the version numbers for the directory of the identified storage server and the volume are identical or if the version numbers are not identical and the storage server query sub-module 260 does not receive a query response from any additional storage servers that identifies that a copy of the file is currently stored at the directory in any of the additional storage servers.

The version number updater sub-module 280 may update version numbers associated with directories of the storage servers and a volume based on the rebalancing of the storage servers of the volume. For example, the version number updater sub-module 280 may update or change the version numbers for directories associated with a storage volume when it has been subjected to a rebalancing operation and for the volume itself when the server storage configuration associated with the volume has been changed. In some embodiments, the updating of the version number may create a mismatch between the version number for the volume and the version numbers for all directories in the volume. The directories or storage servers may be rebalanced within the volume by recalculating the hash number range assignments (as described in conjunction with FIGS. 4A-C) based on a change in the configuration of storage servers associated with the volume, migrating or moving files between storage servers based on the new hash number ranges assigned to storage servers, and then updating the version numbers for the directories at each of the storage servers based on the version number of the volume. Further details with regard to updating version numbers are disclosed in conjunction with FIG. 5.

Figure 3:
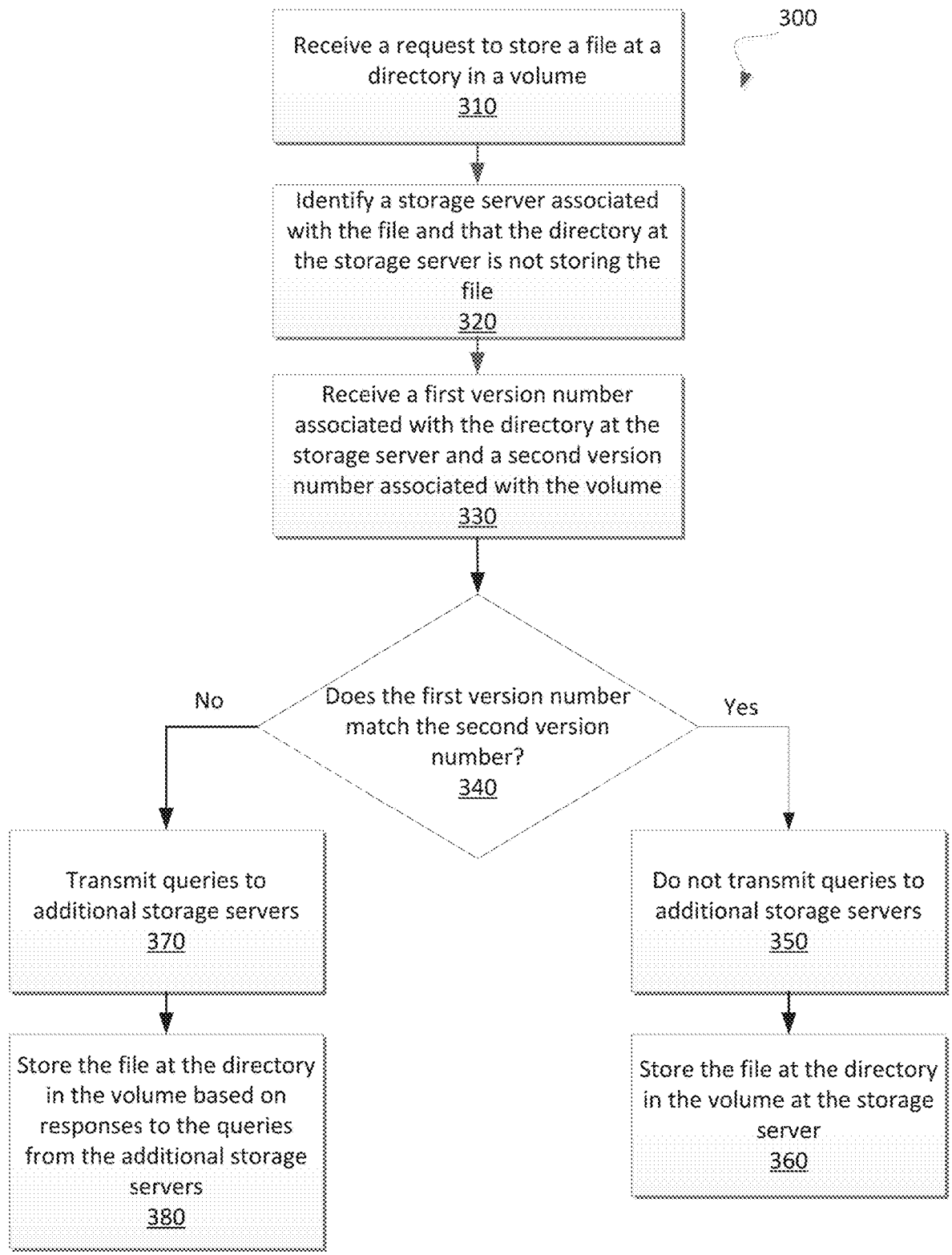
FIG. 3 is a flow diagram of an example method to transmit or not to transmit a query to storage servers of a distributed file system based on a comparison of version numbers in accordance with some embodiments.

FIG. 3 is a flow diagram of an example method 300 to transmit or not to transmit a query to storage servers of a distributed file system based on a comparison of version numbers. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a file location module 190 or 200 of a proxy server associated with a distributed file system.

As shown, the method 300 may begin by the processing logic receiving a request to store or create a file at a directory in a volume (block 310). In some embodiments, the processing logic may receive the request from a client system that is writing a file to be stored at a particular directory in a volume of a distributed file system. The processing logic may further identify a storage server associated with the file and identify that a copy of the file is not stored at the directory at the identified storage server (bock 320). For example, a hash number may be calculated based on the name of the file and a storage server with an assigned hash number range that includes the calculated hash number based on the name of the file may be identified. A determination may be made that the identified storage server does not currently store a file with the calculated hash number at the particular directory. The processing logic may further receive a first version number associated with the directory of the volume at the identified storage server as well as a second version number that is associated with the volume (block 330). For example, the first version number may be retrieved from a storage location associated with the identified storage server and the second version number may be retrieved from another storage location associated with the volume (e.g., at a proxy server). In some embodiments, the volume may include files that are stored in the directory at the identified storage server as well as in the same directory at additional storage servers.

Referring to FIG. 3, the processing logic may subsequently determine if the first version number matches the second version number (block 340). For example, a determination may be made as to whether the first version number associated with the directory of the identified storage server is identical to the second version number associated with the volume that includes the identified storage server. If the first version number matches the second version number, then a query may not be transmitted to additional storage servers associated with the directory of the volume in the distributed file system (block 350). For example, if the first version number of the directory at the identified storage server matches the second version number of the volume, then the identified storage server may be identified as the only possible storage server of the volume that may store the file that is to be created or stored in the volume of the distributed file system (e.g., matching version numbers indicate that no changes to the configuration of the volume have been performed since the last time that the identified storage server associated with the directory was subjected to a rebalancing operation). Accordingly, the processing logic may store the file in the volume in the directory at the identified storage server (block 360). Alternatively, if the identified storage server currently stores a copy of the file to be stored or created at the directory, then the file may not be stored again at the same directory in the identified storage server.

However, if the first version number associated with the directory of the identified storage server does not match the second version number of the volume, then queries may be transmitted to additional storage servers (block 370). For example, a query may be transmitted for each additional storage server that is used to provide storage resources for the directory of the volume of the distributed file system for which the requested file is to be stored or created. Accordingly, one or more queries may be transmitted to one or more additional storage servers. The file may then be stored or created at a storage server in the volume based on responses to the queries from the additional storage servers (block 380). For example, if each query response from each of the additional storage servers indicates that the file is not stored at the particular directory in the respective additional storage server (e.g., a file with the same hash number is not stored at the same directory), then the file may be stored or created at the directory in the identified storage server. However, if at least one response from one of the additional storage servers indicates that the file is stored at the respective directory in the respective additional storage server (e.g., a file with the same hash number is stored at the same directory), then the file may not be stored or created in the directory at the identified storage server.

As such, a request to store or create a file in a volume of a distributed file system may be received. Multiple storage servers of the distributed file system may be used to provide storage resources for a directory in the volume. A hash number may be calculated for the file and a first storage server that corresponds to the hash number may be identified. If the first storage server currently stores a copy of the file from the request at a particular directory, then the requested file may not be stored or created in the directory of the volume as a copy already exists in the directory at the first storage server. However, if the first storage server does not currently store a copy of the file at the directory of the volume, then a first version number associated with the first storage server may be compared with a second version number associated with the volume. If the first and second version numbers match, then no queries may be transmitted to additional storage servers used to provide resources for the directory of the volume as a copy of the file may not be stored at the directory in any of the other storage servers. However, if the first and second versions do not match, then queries may be transmitted to the additional storage servers and the file may subsequently be stored at the directory in the volume if none of the additional storage server responds to the query with an indication that the file is currently stored at the directory at the respective storage server.

Figure 4A:
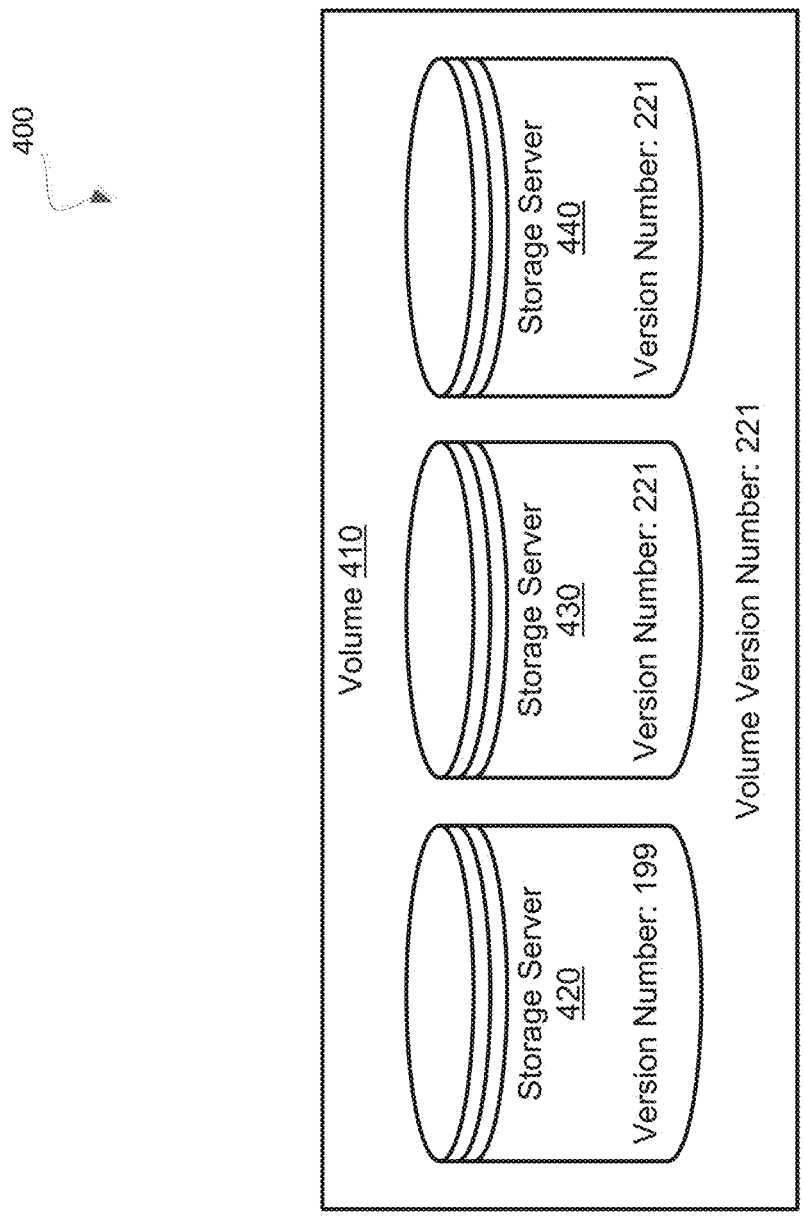
FIG. 4A is an illustrated example of version numbers of a directory associated with storage servers and a volume of a distributed file system in accordance with some embodiments of the disclosure.

FIG. 4A is an illustrated example 400 of version numbers of a directory associated with storage servers and a volume of a distributed file system. In general, the example 400 may illustrate the version numbers used in a distributed file system. As shown, the distributed file system may include a volume 410 that is based on storage servers 420, 430, and 440. In some embodiments, the storage servers 420, 430, and 440 may be associated with a directory of the volume (e.g., the storage servers provide storage resources to a particular directory or path within the volume). The volume 410 may be associated with a volume version number and each storage server may be associated with a directory version number for each directory. Although a single directory version number is shown for each storage server, in some embodiments, each storage server may include multiple directory version numbers where each directory of the volume is associated with a separate directory version number. In some embodiments, the volume version number may be incremented or changed each time that a storage server (or other such resource) is added to or removed from the volume 410. Furthermore, each of the directory version numbers for each storage server may be changed each time that a respective storage server is subjected to a rebalancing operation. For example, after a rebalancing operation has been performed on a storage server, the directory version number may be updated to be the same as the volume version number.

As shown in FIG. 4A, the volume version number for the volume 410 may be identical to the directory version numbers for storage servers 430 and 440. Accordingly, no change to the configuration of the volume has been performed since the storage servers 430 and 440 were subjected to a rebalancing operation. However, the storage server 420 has a different directory version number than the volume version number. Accordingly, the storage server 420 has not been subjected to a rebalancing operation since the configuration of the volume has been changed.

Figure 4B:
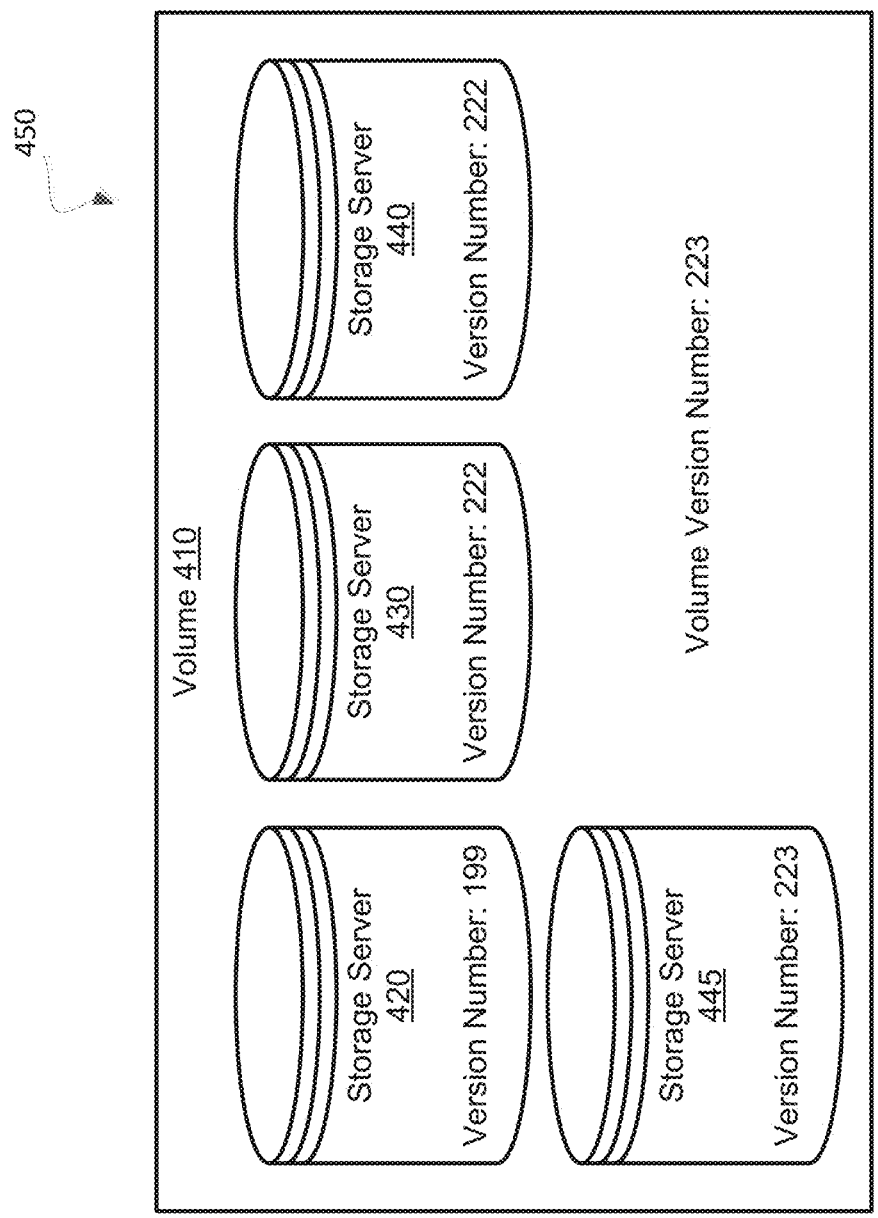
FIG. 4B is an illustrated example of version numbers of a directory associated with storage servers and a volume of a distributed file system after a change to the storage server configuration of the volume in accordance with some embodiments of the disclosure.

FIG. 4B is an illustrated example 450 of version numbers of a directory associated with storage servers and a volume of a distributed file system after a changing of the configuration of the volume. As shown, a new storage server 445 has been added to the volume 410. In response to the adding of the new storage server 445, the volume version number for the volume 410 has been incremented or changed to a new value. However, the directory version numbers for the storage servers 420, 430, and 440 have not been changed.

Figure 4C:
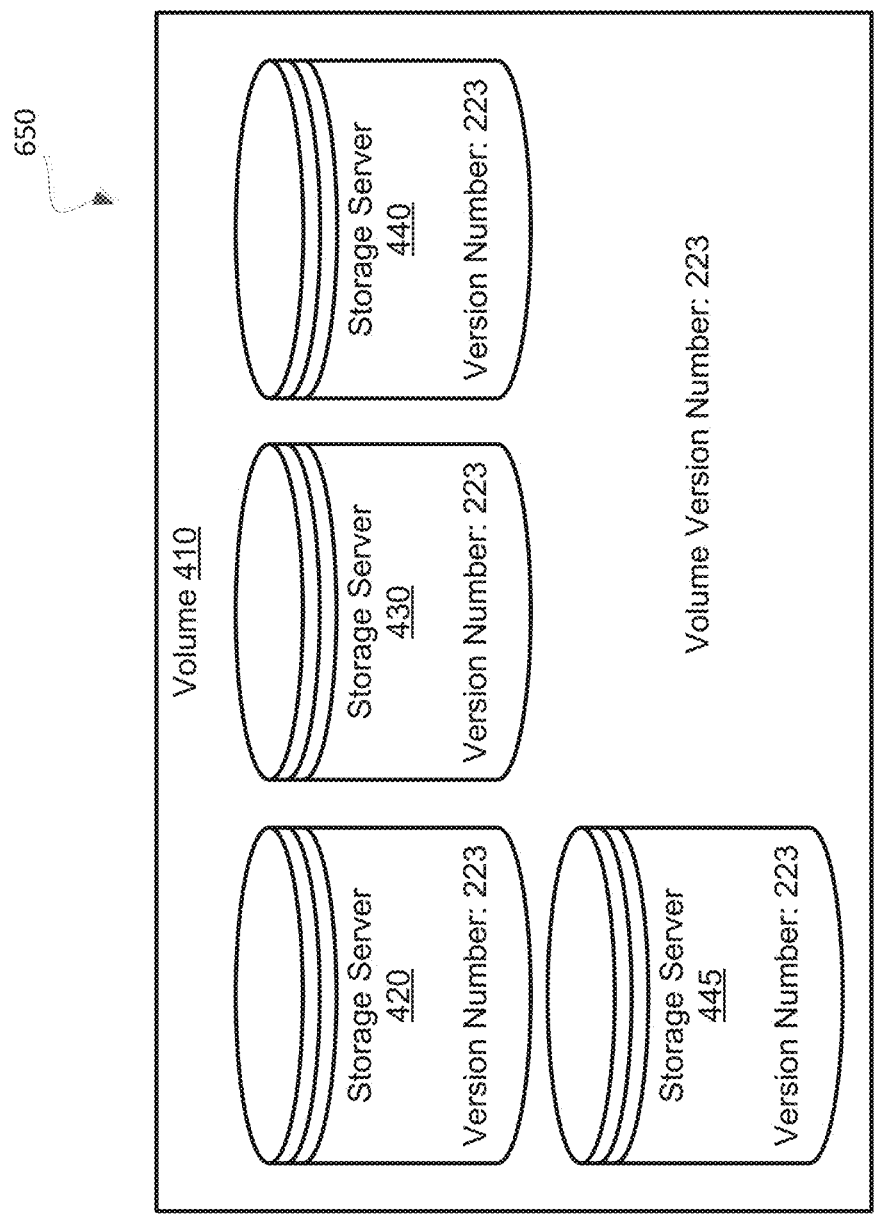
FIG. 4C is an illustrated example of version numbers of a directory associated with storage servers and a volume of a distributed file system after a rebalancing operation has been performed in accordance with some embodiments.

FIG. 4C is an illustrated example 460 of version numbers of a directory associated with storage servers and a volume of a distributed file system after a rebalancing operation has been performed. As shown, the directory version numbers for the storage servers 420, 430, and 440 have been updated to be the same as the volume version number for the volume 410 after the rebalancing operation has been performed to migrate (e.g., move) files between the storage servers 420, 430, 440, and 445 as previously described.

Figure 5:
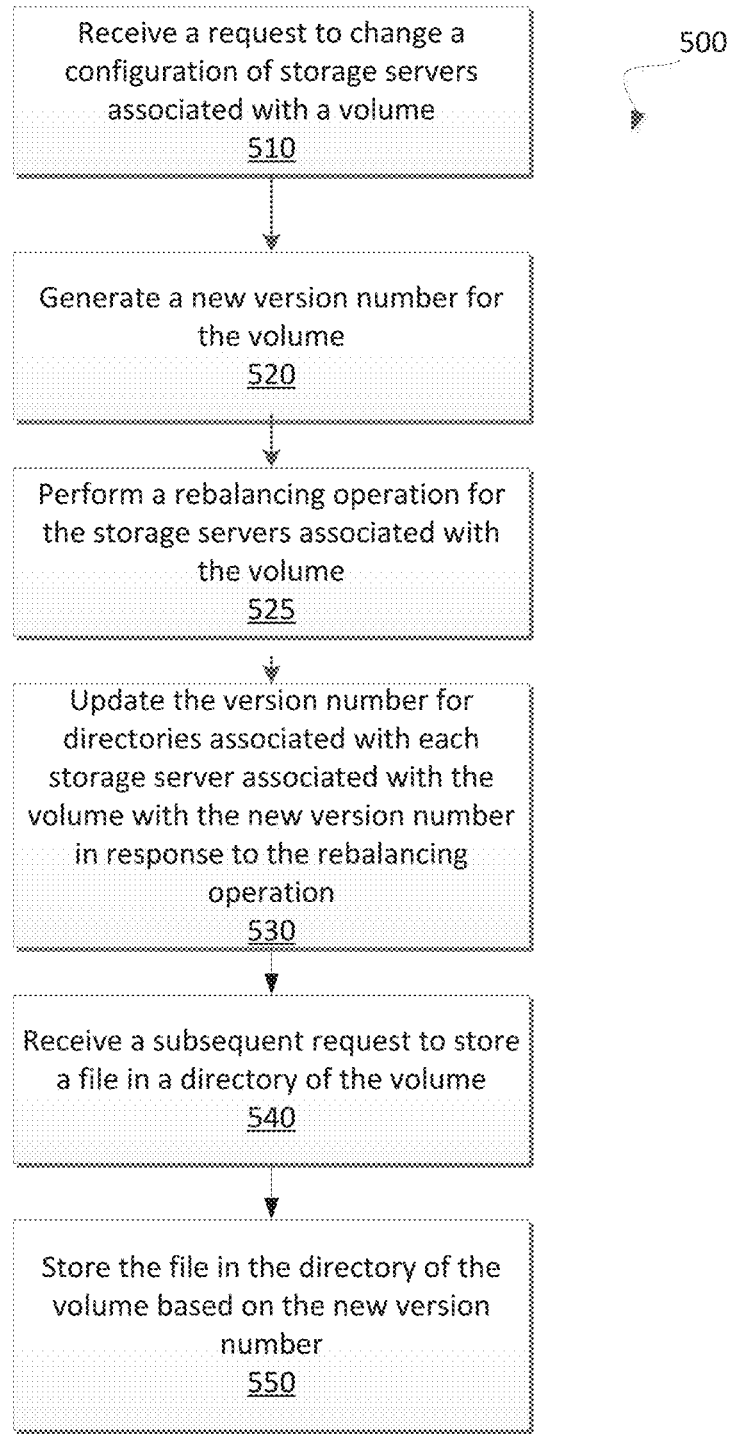
FIG. 5 is a flow diagram of an example method to update version numbers in response to a change in storage server configuration associated with a volume in accordance with some embodiments.

FIG. 5 is a flow diagram of an example method 500 to update version numbers in response to a change in the configuration of storage servers associated with a volume. The method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by a file location module 190 or 200 of a proxy server associated with a distributed file system.

The method 500 may begin with the processing logic receiving a request to change a configuration of storage servers associated with a volume (block 510). For example, a request to add and/or remove one or more storage servers for a volume of a distributed file system may be received. The processing logic may further generate a new version number for the volume (block 520). In some embodiments, the new version number for the volume (e.g., the volume version number) may be updated in response to the change in the configuration of the storage servers of the volume. Furthermore, the processing logic may perform a rebalancing operation for the storage servers of the volume (block 525). In some embodiments, the rebalancing operation may be performed in response to a user input. The processing logic may further update the version number for directories associated with each storage server of the volume with the new version number for the volume (block 530). For example, the directory version numbers for each storage server may be updated to be identical as the volume version number in response to the rebalancing operation being performed on the respective storage servers. The processing logic may additionally receive a subsequent request to store or create a file in a directory of the volume (block 540). Furthermore, the processing logic may then determine to store the file in the directory of the volume based on the new version numbers for the volume and the directory at the storage servers (block 550).

Figure 6:
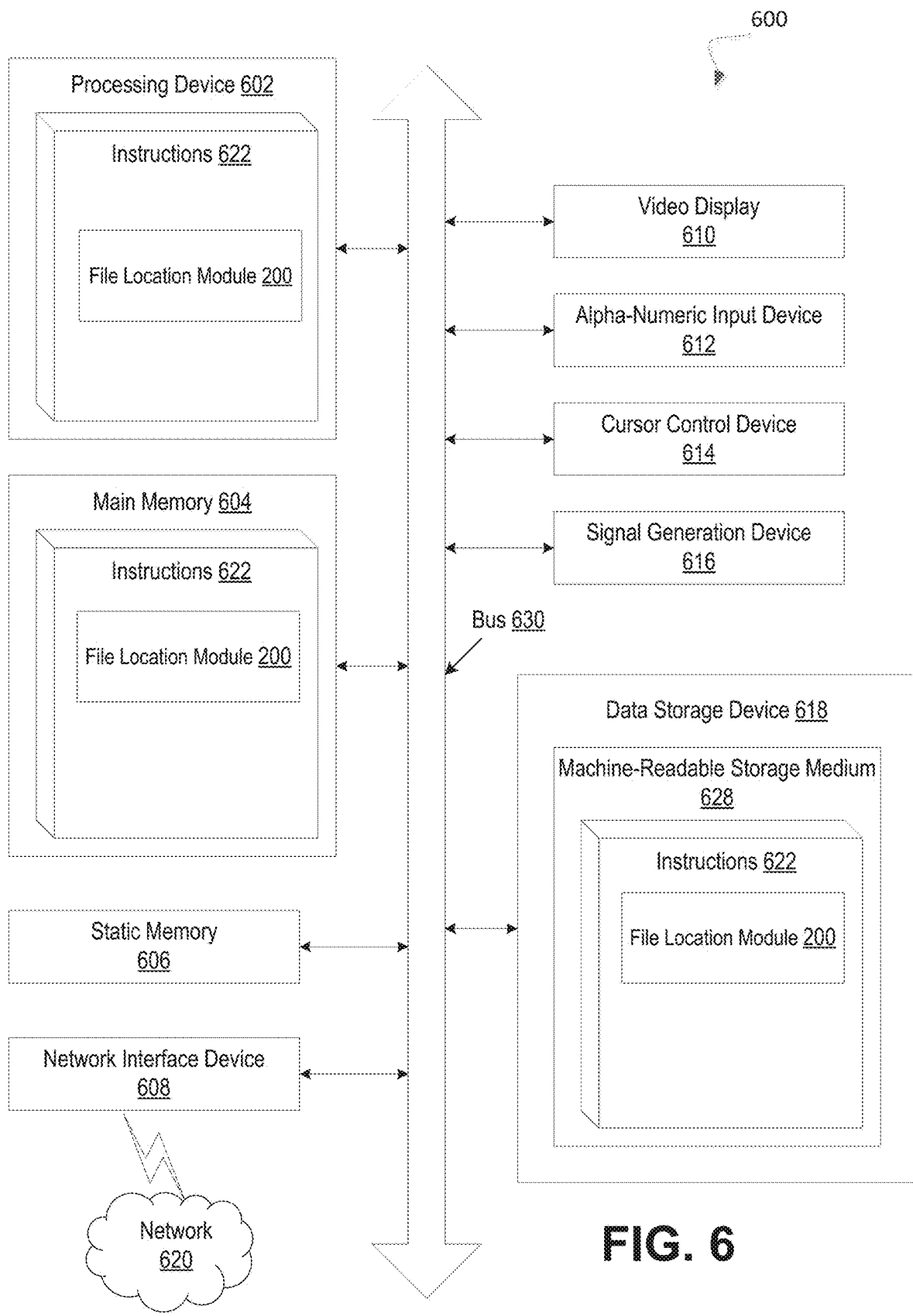
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a file location module (e.g., file location module 190 of FIG. 1 and/or file location module 200 of FIG. 2) and/or a software library containing methods that call modules or sub-modules in a file location module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving a request to store a file in a directory of a volume associated with a distributed file system;
identifying a storage server of a plurality of storage servers of the distributed file system that is associated with the file by determining a hash number based on a name of the file, wherein the storage server of the plurality of storage servers of the distributed file system is associated with a hash number range that includes the determined hash number based on the name of the file;
comparing, by a processing device, a first version number associated with the directory with a second version number associated with the volume, wherein the second version number is associated with a last time that one or more other storage servers associated with the volume are added or removed from the distributed file system and the first version number is associated with a last time that a rebalancing operation associated with the storage server was performed, wherein the first version number is updated to match the second version number in response to performing the rebalancing operation;
determining that the first version number matches the second version number and that a copy of the file is not currently stored at the storage server; and
storing the file in the directory at the storage server of the plurality of storage servers of the distributed file system without querying additional storage servers from the plurality of storage servers to determine that a copy of the file is not currently stored at those storage servers responsive to the determining that the first version number matches the second version number and that the copy of the file is not currently stored at the storage server.

2. The method of claim 1, further comprising:
transmitting queries to additional storage servers of the plurality of storage servers of the distributed file system when the first version number does not match the second version number.

3. The method of claim 2, further comprising:
receiving responses to the queries from the additional storage servers, wherein each of the responses indicates if a copy of the file is stored in the directory at the respective additional storage server or if the copy of the file is not stored in the directory at the respective additional storage server.

4. The method of claim 3, further comprising:
storing the file at the storage server of the plurality of storage servers when each of the responses indicates that the copy of the file is not stored in the directory at the respective additional storage server and not storing the file at the storage server of the plurality of storage servers when at least one of the responses indicates that the copy of the file is stored in the directory at the respective additional storage server.

5. The method of claim 1, wherein the rebalancing operation is associated with assigning new hash number ranges to each of the storage servers after the adding or removing of the other storage servers associated with the volume from the distributed file system.

6. A system comprising:
a memory; and
a processing device operatively coupled with the memory to:
receive a request to store a file in a directory of a volume associated with a distributed file system;

identify a storage server of a plurality of storage servers of the distributed file system that is associated with the file by determining a hash number based on a name of the file, wherein the storage server of the plurality of storage servers of the distributed file system is associated with a hash number range that includes the determined hash number based on the name of the file;

compare a first version number associated with the directory with a second version number associated with the volume, wherein the second version number is associated with a last time that one or more other storage servers associated with the volume are added or removed from the distributed file system and the first version number is associated with a last time that a rebalancing operation associated with the directory was performed, wherein the first version number is updated to match the second version number in response to performing the rebalancing operation;

determine that the first version number matches the second version number and that a copy of the file is not currently stored at the storage server; and store the file in the directory at the storage server of the plurality of storage servers of the distributed file system without querying additional storage servers from the plurality of storage servers to determine that a copy of the file is not currently stored at those storage servers when the first version number matches the second version number and when a copy of the file is not currently stored at the storage server.

7. The system of claim 6, wherein the processing device is further to:
transmit queries to additional storage servers of the plurality of storage servers of the distributed file system when the first version number does not match the second version number.

8. The system of claim 7, wherein the processing device is further to:
receive responses to the queries from the additional storage servers, wherein each of the responses indicates if a copy of the file is stored in the directory at the respective additional storage server or if the copy of the file is not stored in the directory at the respective additional storage server.

9. The system of claim 8, wherein the processing device is further to:
store the file at the storage server of the plurality of storage servers when each of the responses indicates that the copy of the file is not stored in the directory at the respective additional storage server and not storing the file at the storage server of the plurality of storage servers when at least one of the responses indicates that the copy of the file is stored in the directory at the respective additional storage server.

10. The system of claim 6, wherein the rebalancing operation is associated with assigning new hash number ranges to each of the storage servers after the adding or removing of the other storage servers associated with the volume from the distributed file system.

11. A non-transitory machine-readable storage medium including data that, when accessed by a processing device, cause the processing device to:

receive a request to store a file in a volume associated with a distributed file system;

identify a storage server of a plurality of storage servers of the distributed file system that is associated with the file by determining a hash number based on a name of the file, wherein the storage server of the plurality of storage servers of the distributed file system is associated with a hash number range that includes the determined hash number based on the name of the file;

compare a first version number associated with the storage server with a second version number associated with the volume, wherein the second version number is associated with a last time that one or more other storage servers associated with the volume are added or removed from the distributed file system and the first version number is associated with a last time that a rebalancing operation associated with the storage server was performed, wherein the first version number is updated to match the second version number in response to performing the rebalancing operation;

determine that the first version number matches the second version number and that a copy of the file is not currently stored at the storage server; and store the file at the storage server of the plurality of storage servers of the distributed file system without querying additional storage servers from the plurality of servers to determine that a copy of the file is not currently stored at those storage servers when the first version number matches the second version number and when a copy of the file is not currently stored at the storage server.

12. The non-transitory machine-readable storage medium of claim 11, wherein the first version number associated with the storage server corresponds to a directory at the storage server.

13. The non-transitory machine-readable storage medium of claim 11, the processing device further to:
transmit queries to additional storage servers of the plurality of storage servers of the distributed file system when the first version number does not match the second version number; and
receive responses to the queries from the additional storage servers, wherein each of the responses indicates if a copy of the file is stored at the respective additional storage server or if the copy of the file is not stored at the respective additional storage server.

14. The non-transitory machine-readable storage medium of claim 13, the processing device further to:
store the file at the storage server of the plurality of storage servers when each of the responses indicates that the copy of the file is not stored at the respective additional storage server and not storing the file at the storage server of the plurality of storage servers when at least one of the responses indicates that the copy of the file is stored at the respective additional storage server.

15. The non-transitory machine-readable storage medium of claim 11, wherein the rebalancing operation is associated with assigning new hash number ranges to each of the storage servers after the adding or removing of the other storage servers associated with the volume from the distributed file system.

* * * * *